United States Patent
Koyano

(10) Patent No.: US 8,259,312 B2
(45) Date of Patent: Sep. 4, 2012

(54) INFORMATION PROCESSING APPARATUS HAVING A CAPABILITY OF HALTING A PRINTING PROCESS FOR OFF-LINE PROCESSING, AND METHOD AND PROGRAM FOR CONTROLLING PRINTING PROCESS INCLUDING HALTING THE PRINTING PROCESS FOR OFF-LINE PROCESSING

(75) Inventor: Hiroki Koyano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 12/402,281

(22) Filed: Mar. 11, 2009

(65) Prior Publication Data

US 2009/0174904 A1 Jul. 9, 2009

Related U.S. Application Data

(63) Continuation of application No. 10/692,502, filed on Oct. 24, 2003, now Pat. No. 7,528,969.

(30) Foreign Application Priority Data

Oct. 31, 2002 (JP) .................................. 2002-318427
Sep. 22, 2003 (JP) .................................. 2003-330217

(51) Int. Cl.
    *G06F 3/12* (2006.01)
(52) U.S. Cl. ....... 358/1.1; 358/1.13; 358/1.14; 358/1.15
(58) Field of Classification Search .................. 358/1.13, 358/1.14, 1.15
    See application file for complete search history.

(56) References Cited

U.S. PATENT DOCUMENTS

| | | | | |
|---|---|---|---|---|
| 5,745,712 A * | 4/1998 | Turpin et al. | .................. | 715/763 |
| 6,433,883 B1 * | 8/2002 | Kajita | .......................... | 358/1.14 |
| 6,442,358 B1 * | 8/2002 | Regelsberger et al. | ......... | 399/85 |
| 6,483,999 B1 * | 11/2002 | Andersen et al. | ............... | 399/87 |
| 6,570,605 B1 * | 5/2003 | Kashiwazaki | ................ | 347/264 |
| 6,639,687 B1 * | 10/2003 | Neilsen | ........................ | 358/1.14 |
| 2002/0021454 A1 * | 2/2002 | Johnson et al. | .............. | 358/1.14 |

(Continued)

FOREIGN PATENT DOCUMENTS

EP 1246051 A2 10/2002
JP 2000132347 A * 5/2000

OTHER PUBLICATIONS

JP 2000132347 A, Yano, Takanori, (a copy of machine translation is provided).*
Personalized Print Markup Language. PODi. vol. 1.5. PPML Working Group, 2001. (sections 3.2, 4.1-4.6.5, 6.1-6.4.5).

Primary Examiner — Jacky X Zheng
(74) Attorney, Agent, or Firm — Canon USA Inc IP Division

(57) ABSTRACT

A printing process is preset for each page of a print job such that the printing process is halted when a page needs off-line processing, and the printing process is resumed in response to an operation to resume the printing process. After the print job is started, a CPU determines for each page whether off-line processing is specified to be performed. If the current page is specified to be subjected to off-line processing, the printing process is halted. If an operation to resume the print processing is detected, the printing process is resumed. Thus, after the print job is started, a user can make a confirmation in terms of the printing state of the printer before printing for the particular page is started.

9 Claims, 11 Drawing Sheets

U.S. PATENT DOCUMENTS

| | | |
|---|---|---|
| 2002/0114007 A1 | 8/2002 | Hayashi |
| 2002/0131075 A1 | 9/2002 | Kremer |
| 2003/0030836 A1* | 2/2003 | Maekawa .................... 358/1.14 |
| 2003/0053110 A1* | 3/2003 | Lester et al. ................. 358/1.14 |
| 2003/0234950 A1* | 12/2003 | Lay ............................ 358/1.14 |

* cited by examiner

| PRINT JOB INFORMATION | |
| --- | --- |
| OFF-LINE PROCESSING | NO |
| PRINT PAGE INFORMATION | |
| NUMBER OF PAGES TO BE PRINTED | 5 |
| PRINT FORM | FORM INFORMATION 1 |
| OFF-LINE PROCESSING | IN ACCORDANCE WITH THE SETTING IN THE PRINT JOB |
| PAGE PRINT DATA | |
| PRINT FORM | FORM INFORMATION 2 |
| OFF-LINE PROCESSING | YES |
| PAGE PRINT DATA | |
| ⋮ | ⋮ |
| PRINT FORM | FORM INFORMATION 5 |
| OFF-LINE PROCESSING | NO |
| PAGE PRINT DATA | |

INFORMATION PROCESSING APPARATUS HAVING A CAPABILITY OF HALTING A PRINTING PROCESS FOR OFF-LINE PROCESSING, AND METHOD AND PROGRAM FOR CONTROLLING PRINTING PROCESS INCLUDING HALTING THE PRINTING PROCESS FOR OFF-LINE PROCESSING

CROSS-REFERENCE TO RELATED APPLICATIONS

This application is a continuation of U.S. patent application Ser. No. 10/692,502, filed on Oct. 24, 2003, which claims priority to Japanese Patent Application 2002/318427, filed on Oct. 31, 2002 and Japanese Patent Application 2003/330217, filed on Sep. 22, 2003, the contents of all of which are hereby incorporated by reference.

BACKGROUND OF THE INVENTION

1. Field of the Invention

The present invention relates to an information processing apparatus capable of performing printing process using application software and outputting a print job, a printing process control method, and a printing process control program.

2. Description of the Related Art

In some conventional printing systems, a printing process control program executed on an information processing apparatus has a capability of halting a printing process (to allow off-line processing to be performed) to allow a user to confirm, before a print job is started, whether print data processed by application software has been correctly transmitted to a printer, a stack of paper is correctly set on a paper cassette and the cassette is correctly set in a paper feed slot, a double-sided printing apparatus is correctly coupled with the printer, a paper feed-out tray is correctly set, and so on. If the user issues a resume command after completion of confirmation, the printing process is resumed (refer to, for example, Japanese Patent Laid-Open Nos. 11-316660 and 2000-255139).

In a case in which printing is performed in a network environment, in order to prevent a current print job from being interrupted by another print job, print data including a plurality of associated pages is generally treated as one print job.

However, in the conventional technique, off-line processing is allowed in units of print jobs. That is, off-line processing is allowed only before a print job is started, and is not allowed in the middle of the print job.

For example, let us assume that print data treated as one print job includes a set of pages and that the type of printing paper is required to be changed depending on the pages.

Let us further assume that each page of the print data has to be printed on a specific type of paper such as preprinted paper exactly corresponding to the page and that stacks of paper are stored on different paper cassettes depending on the type of paper.

If the print job, which is needed to be treated in the above-described manner, is preformed using a printer having paper feed slots whose number is smaller than the number of paper cassettes, it is necessary to exchange one or more paper cassettes in the middle of the print job. However, in the conventional printing system, the print job is not automatically halted when exchanging of paper cassettes is needed.

As a result, some pages are printed on paper whose type is different from the type desired by a user.

The above problem can be avoided if the print job is divided into a plurality of print jobs. However, dividing the print job creates new problems such as longer print time and that the print job can be interrupted by another print job.

SUMMARY OF THE INVENTION

In view of the above, it is an aspect of the present invention to provide an information processing apparatus, a print control method, and a print control program, capable of controlling a printing process such that when a printer performs a print job of document data including a plurality of pages received from the information processing apparatus, off-line processing is performed for each page preset to be subjected to off-line processing, whereby, after the print job is started, a user can make a confirmation in terms of the printing state of the printer before printing for the particular page is started, thereby ensuring that printing is performed in exactly the same manner as desired by the user.

It is another aspect of the present invention to provide an information processing apparatus, a print control method, and a print control program, capable of controlling a printing process for a print job of document data including a plurality of pages by inserting an off-line command in each desired page of the print job, whereby after the print job is started, off-line processing is performed for each specified page of the print job, thereby allowing a user to make a confirmation in terms of the printing state of the printer before printing for the particular page is started, and thus ensuring that printing is performed in exactly the same manner as desired by the user.

In one aspect, the present invention provides an information processing apparatus that processes document data including a plurality of pages as one print job and transfers the print job to a printer, the apparatus comprising setting means for setting whether to halt the printing process of the printer for each page of the print job, command generation means for generating an off-line command for each page at which to halt the printing process of the printer after starting the print job in accordance with the setting made by the setting means, determination means for, when the off-line processing is set to be performed at the current page, determining whether an operation for resuming the printing process has been performed on the printer, and resuming means for resuming the printing process of the printer for the document data including the pages at which the off-line processing is set to be performed in accordance with the result of the determination made by the determination means.

In another aspect, the present invention provides an information processing apparatus that processes document data including a plurality of pages as one print job and outputs the print job to a printer to print the print job, the apparatus comprising setting means for setting whether to halt the printing process of the printer for each page of the print job, command generation means for generating an off-line command for each page at which to halt the printing process of the printer in accordance with the setting made by the setting means, job generation means for generating the print job on the basis of the document data such that the off-line command generated by the command generation means is inserted in each specified page, and job output means for outputting the print job, including the off-line command generated by the job generation means and inserted in each specified page, to the printer to print the print job.

In yet another aspect, the present invention provides a printing process control method in an information processing apparatus for processing document data including a plurality of pages as one print job and transferring the print job to a printer, the method comprising the steps of setting whether to halt the printing process of the printer for each page of the print job, generating an off-line command for each page at which to halt the printing process of the printer after starting the print job in accordance with the setting made in the setting step when the off-line processing is set to be performed at the current page, determining whether an operation for resuming the printing process has been performed on the printer, and resuming the printing process of the printer for the document data including the pages at which the off-line processing is set to be performed, in accordance with the result of the determination made in the determination step.

In still yet another aspect, the present invention provides a printing process control method in an information processing apparatus for processing document data including a plurality of pages as one print job and outputting the print job to a printer to print the print job, the method comprising the steps of setting whether to halt the printing process of the printer for each page of the print job, generating an off-line command for each page at which to halt the printing process of the printer in accordance with the setting made in the setting step, generating an off-line command for each page at which to halt the printing process of the printer, in accordance with the setting made in the setting step, and outputting the print job, including the off-line command generated in the job generation step and inserted in each specified page, to the printer to print the print job.

In another aspect, the present invention provides a printing process control program executed in an information processing apparatus to process document data including a plurality of pages as one print job and transfer the print job to a printer, the program comprising the steps of setting whether to halt the printing process of the printer for each page of the print job, generating an off-line command for each page at which to halt the printing process of the printer after starting the print job in accordance with the setting made in the setting step when the off-line processing is set to be performed at the current page, determining whether an operation for resuming the printing process has been performed on the printer, and resuming the printing process of the printer for the document data including the pages at which the off-line processing is set to be performed, in accordance with the result of the determination made in the determination step.

In another aspect, the present invention provides a printing process control program executed in an information processing apparatus to process document data including a plurality of pages as one print job and output the print job to a printer to print the print job, the program comprising the steps of setting whether to halt the printing process of the printer for each page of the print job, generating an off-line command for each page at which to halt the printing process of the printer in accordance with the setting made in the setting step, generating the print job on the basis of the document data such that the off-line command generated in the command generation step is inserted in each specified page, and outputting the print job, including the off-line command generated in the job generation step and inserted in each specified page, to the printer to print the print job.

Further aspects and features of the present invention will become apparent from the following description of the exemplary embodiments with reference to the attached drawings, in which like reference characters designate the same or similar parts throughout the figures thereof.

DESCRIPTION OF THE EXEMPLARY EMBODIMENTS

Figure 1:
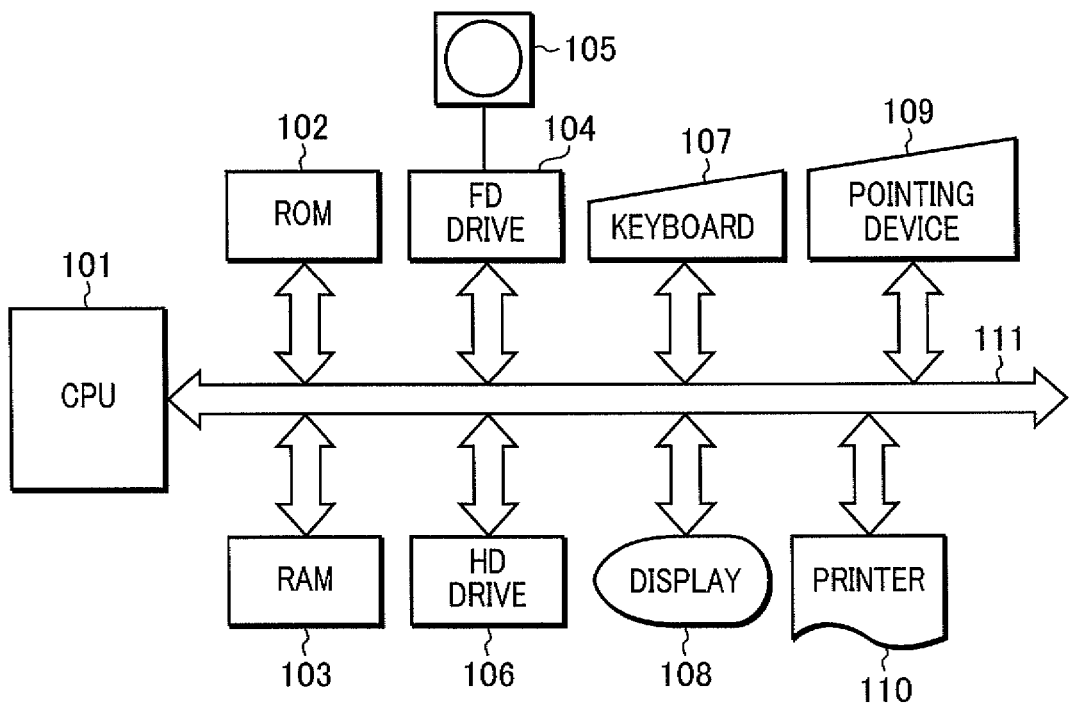
FIG. 1 is a block diagram showing a construction of a printing process control system according to a first embodiment of the present invention.

FIG. 1 is a block diagram showing a construction of a printing process control system according to a first embodiment of the present invention.

This printing process control system includes a CPU 101 serving as an information processing apparatus, a ROM 102 and a RAM 103 forming a main memory, a floppy disk (FD) drive 104 and a hard drive (HD) drive 106 serving as external storage devices, a keyboard 107 and a pointing device 109, such as a mouse, serving as input devices, a display 108, a printing apparatus 110, such as a printer or a plotter, and a system bus 111 via which the components 101 to 110 are connected with each other. This printing process control system is connected to a plurality of information processing apparatuses via a network bus (not shown). The printing apparatus 110 may be connected via a local interface or a network. The information processing apparatus is capable of detecting whether the printer is in an off-line state by using a known technique.

The information processing apparatus operates by executing a basic I/O program, an operating system (OS), and a program on the CPU 101. The basic I/O program is stored in the ROM 102, and the OS is stored in the HD drive 106. When the power of the information processing apparatus is turned on, the OS is loaded into the RAM 103 from the HD drive 106 by an IPL (Initial Program Loader) in the basic I/O program, and the operation of the OS is started. The RAM 103 is also used as a memory area in which an application program is loaded from the HD drive 106 serving as an external storage device, and the loaded application program is executed. Various application programs, such as a form information design system, an overlay print system, and a program for producing page data, which will be described later, are also stored in the memory area provided by the RAM 103. The printing apparatus 110 is connected with the computer according to the present embodiment via an input/output controller (IOC) although not shown in the figure. The printing apparatus 110 is capable of storing, in a memory, form information supplied from the computer beforehand whereby overlay printing is performed such that an overlay pattern is produced by overlaying text data supplied from the computer on the form information stored in the memory, and printing is performed in accordance with the resultant overlay pattern.

Figure 2:
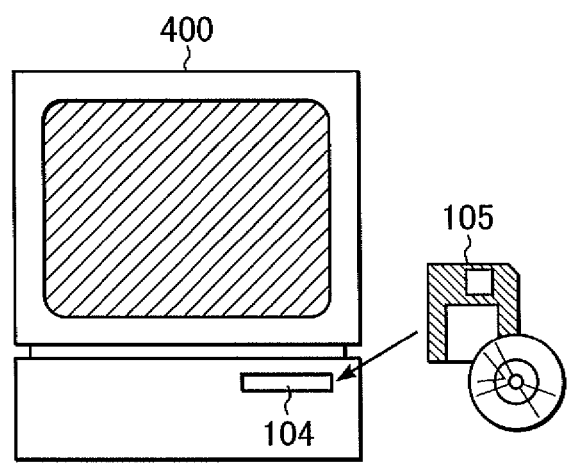
FIG. 2 is a diagram showing a manner in which a program is loaded in the printing process control system shown in FIG. 1.

FIG. 2 is a diagram showing a manner in which a program is loaded into the printing process control system shown in FIG. 1. More specifically, various programs described later are loaded from the FD drive 104 shown in FIG. 1 onto the HD drive 106 of the host computer 400.

That is, a control program and associated data stored on a floppy disk 105 are loaded, as shown in FIG. 2, into the computer system such as that shown in FIG. 1 via the FD drive 104. If the floppy disk 105 is set on the FD drive 104, the control program and associated data are read from the floppy disk 105 under the control of the OS and the basic I/O program, and the control program is loaded into the RAM 103 in such a manner that the control program is operable.

Figure 3:
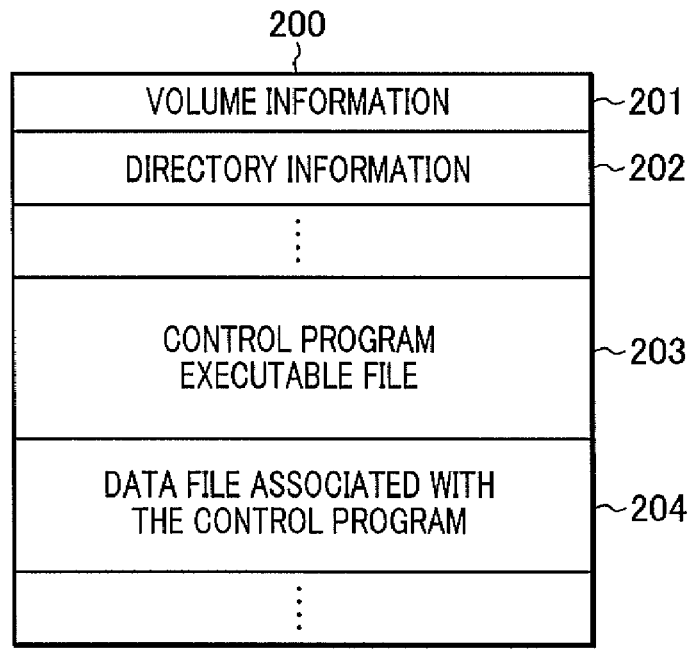
FIG. 3 is a diagram illustrating the data structure of a FD shown in FIG. 2.

FIG. 3 is a diagram showing a data structure of the floppy disk 105 shown in FIG. 2. Although in the present embodiment, the control program and the associated data are stored on the floppy disk 105, the control program and the associated data may be loaded from another type of storage medium, such as a CD-ROM or a DVD, via another drive.

In the present embodiment, as shown in FIG. 3, a control program executable-file 203 and a data file 204 associated with the control program stored on the medium 200 are managed by volume information 201 and directory information 202.

Figure 4:
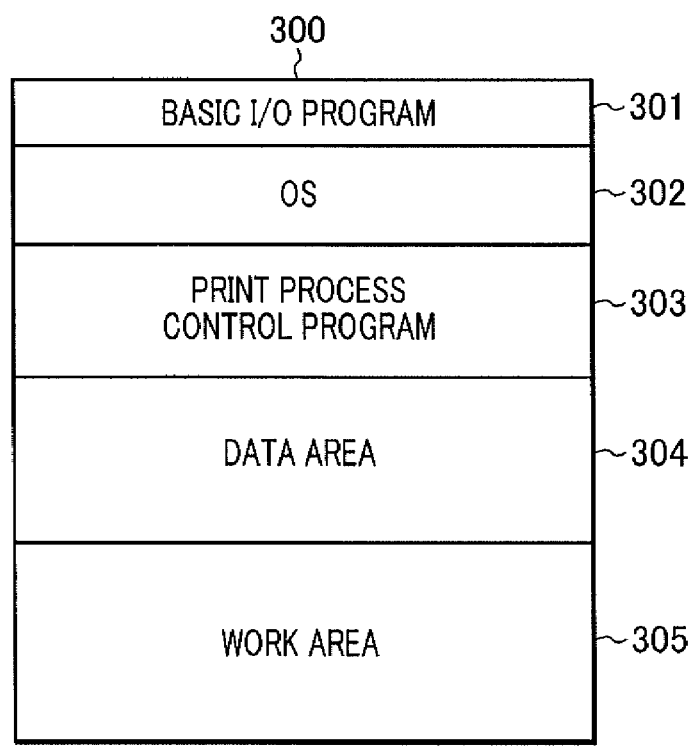
FIG. 4 is a diagram showing the memory map of a RAM shown in FIG. 1.

FIG. 4 is a diagram showing the memory map of the RAM 103 shown in FIG. 1, in a state in which a control program is loaded in an executable fashion in the RAM 103.

As shown in FIG. 4, the control program stored on the floppy disk 105 is loaded into the RAM 103 via the FD drive 104.

In the present system, a basic I/O program 301, an OS such as the Windows® system 302, and an application (printing process control program 303) according to the present invention are executed in the memory map 300. Herein, reference numeral 304 denotes a data area and reference numeral 305 denotes a free area. The sizes of those areas vary depending on the program being executed.

In the present embodiment, the basic I/O program is stored in the ROM 102 shown in FIG. 1, and the operating system is stored in the external storage device such as the HD drive 106 shown in FIG. 1. When the power is turned on, the operating system is loaded into a particular area of the RAM 103 from the HD drive 106 by an IPL (Initial Program Loader) in the basic I/O program, and the operation of the operating system 302 is started.

Although in the present embodiment the control program and the associated data are loaded directly from the floppy disk 105 into the RAM 103 and executed in the RAM 103, the program and the associated data may be stored (installed) beforehand in the HD drive 106 from the floppy disk 105 as shown in FIG. 2. The program and the associated data may be loaded from the HD drive 106 into the RAM 103 when the program is actually executed.

The storage medium for storing the control program is not limited to the floppy disk, and other storage media such as a CD-ROM or an IC memory card may also be used.

Alternatively, the program may be stored in the ROM 102 such that the ROM 102 forms a part of the memory map, and the CPU 101 may directly execute the program.

The present invention may be advantageously applied to a system in which printing media are changed depending on pages of a document to be printed. For example, the present invention is particularly very useful when print data is overlaid on a predetermined form such as an estimate form or a bill form in units of pages, and resultant overlaid data is printed (hereinafter, such a printing process will be referred to as overlay printing).

In overlay printing, form information such as a writing paper form or the like is registered beforehand using a page registration capability or a form registration capability of a page printer such as a laser printer, and, in an actual printing process, text data is overlaid on the registered form information such as the writing paper form using a page information usage capability or a form information usage capability, and the resultant overlaid data is printed. In general, a form (form information) used in overlay printing is produced using a dedicated form information design system.

Figure 10:
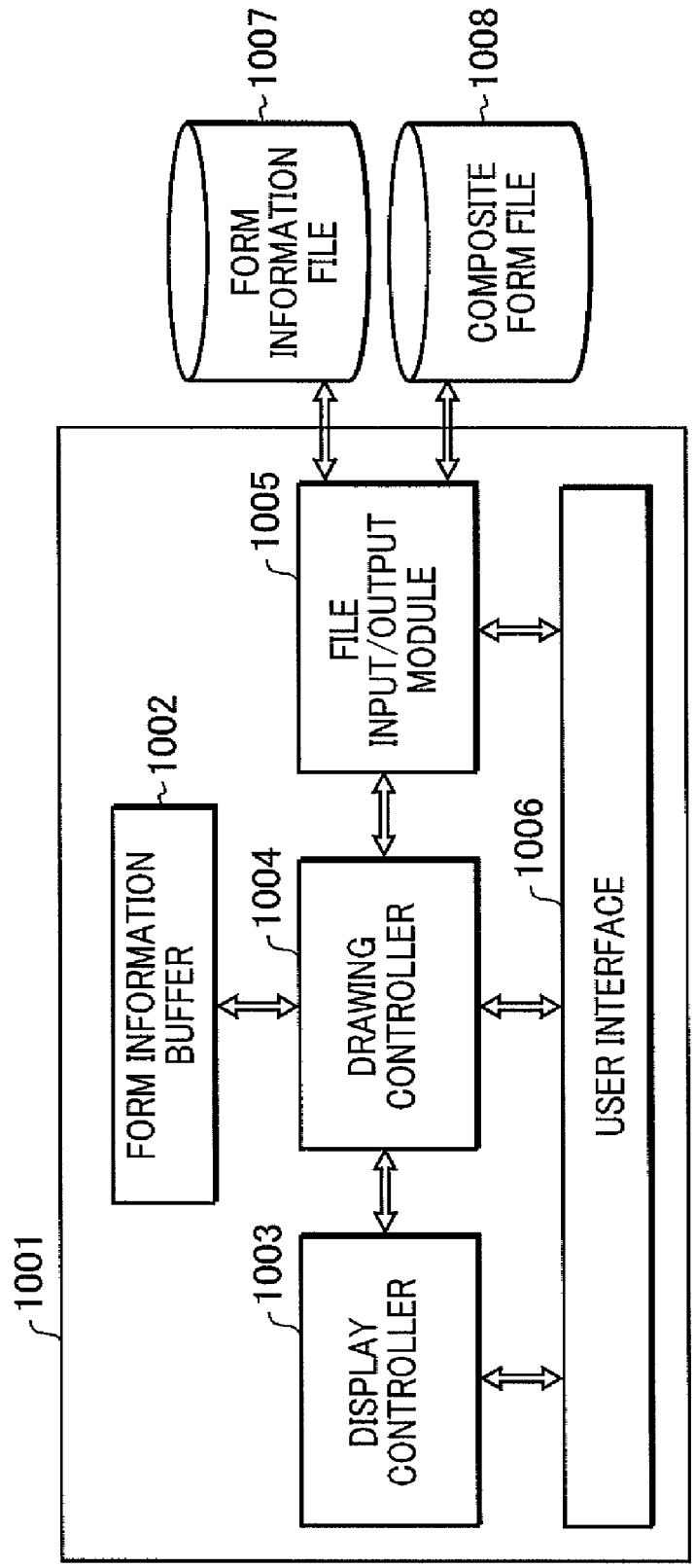
FIG. 10 is a functional diagram generally showing a form information design system in the information processing apparatus, according to the present invention.

FIG. 10 is a functional diagram generally showing a form information design system according to an embodiment of the present invention.

The form information design system 1001 is an application for designing form information and is stored on the external storage device (HD) 106 shown in FIG. 1. Although in the following description each functional block is assumed to be in the form of a unit, it is desirable that a program module realizes each functional block.

The CPU 101 controls a form information buffer 1002, a display controller 1003 (display control program), a drawing controller 1004 (drawing control program), a file input/output unit 1005 (file input/output control program), which will be described later, and a user interface 1006 (general control program), which will be described later, all of which are part of the form information design system 1001. The CPU 101 receives, in accordance with the display controller 1003, a command such as a command to execute the form information design system and a command to produce form information, which is input using pointing means 109. The CPU 101 analyzes the received command, such as a setting command or a command to produce form information, in accordance with the user interface 1006. In accordance with the result of the analysis, the CPU 101 issues a processing request as an internal command to the drawing control unit 1004 or the file input/output unit 1005.

In accordance with the user interface 1006, the CPU 101 returns a result of processing performed by the drawing control unit 1004 or the file input/output unit 1005 to the display control unit 1003. In accordance with the display control unit 1003, the CPU 101 displays the result of the processing on the display 108.

More specifically, the display control unit 1003 is a program to display, on the display 108 shown in FIG. 1, a form pattern being designed in accordance with form information stored in the form information buffer 1002 via the drawing control unit 1004, and to accept various commands input by a user using the keyboard 107 or the pointing device 109 shown in FIG. 1, such as a setting command or a command to produce form information.

The drawing control unit 1004 is a program to manage the form information buffer 1002, input and output all elements of produced form information into or from the form information buffer 1002, and bidirectionally transfer the form information to the display controller 1003 and the file input/output unit 1005 in accordance with a command issued by the user interface 1006.

The file input/output unit 1005 is a program to, in accordance with the user interface 1006, write or read form information being designed on the form information buffer 1002 via the drawing control unit 1004 into or from a form information file 1007 on the external storage device 106 shown in FIG. 1. The file input/output unit 1005 can also read a plurality of form information files 1007 and can read and write a composite form file 1008 in which an order, a combination, and setting in terms of printing condition are defined for the form information files. The composite form file 1008 is displayed on the display 108 shown in FIG. 1 and produced via a design window 1401 such as that shown in FIG. 14.

Figure 11:
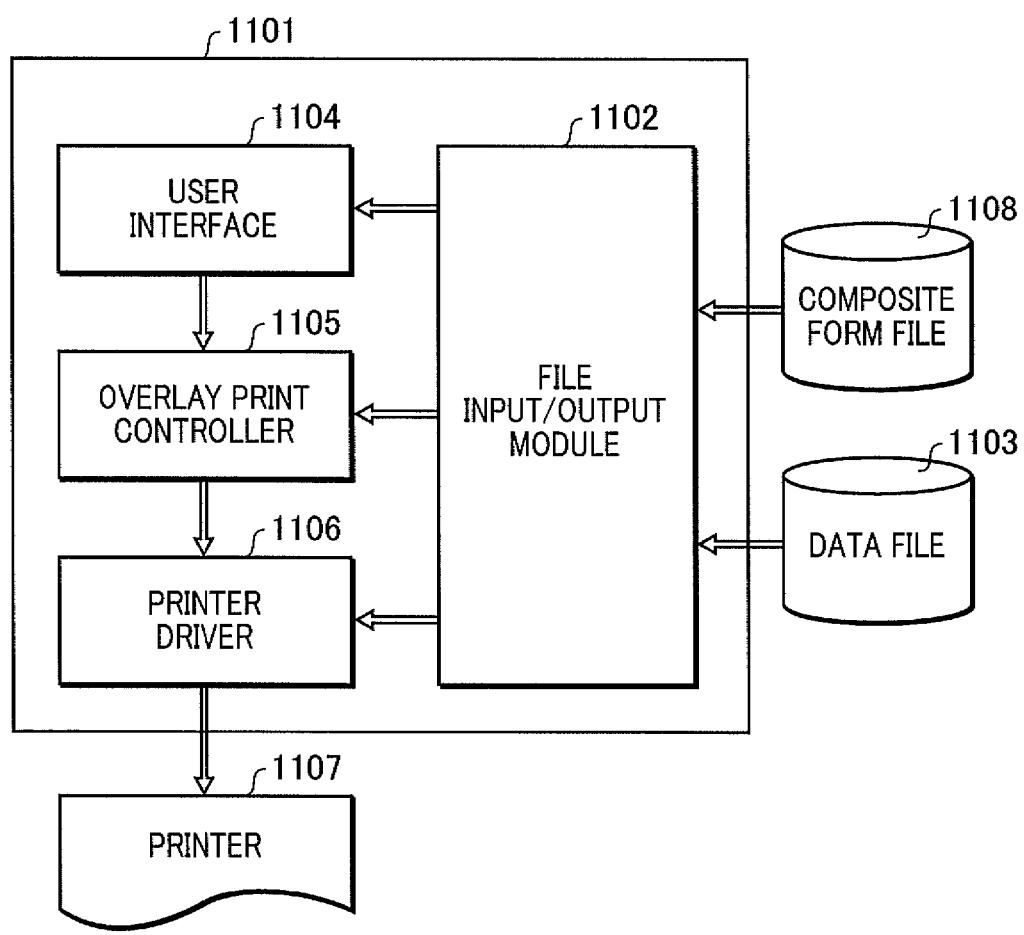
FIG. 11 is a block diagram showing an overlay print system in the information processing apparatus, according to the present invention.

FIG. 11 is a block diagram showing the configuration of the overlay print system. In contrast to FIG. 10 showing the functional blocks of the application for producing a form file (or a composite form file), FIG. 11 shows functional blocks of the application for performing overlay printing in accordance with the produced form file.

In FIG. 11, reference numeral 1101 denotes the entire form information design system 1001 that is an application to perform overlay printing in accordance with the form information. The form information design system 1001 is stored on the external storage device (HD) 106 shown in FIG. 1. Although in the following description each functional block is assumed to be in the form of a unit, it is desirable that a program module realizes each functional block.

The CPU 101 controls a file input/output unit 1102 (file input/output control program) which is described later, a user interface 1104 (control program), and a printer driver 1106 (printer control program) in accordance with an overlay print controller 1105 (overlay print control program), which is described later, all of which are part of the overlay print system 1101.

The user interface 1104 is a program to read a composite form file 1008 and a data file 1103 from the external storage device 106 via the file input/output unit 1102 and display a preview of a result of inputting (overlaying) data of the data file 1103 in fields of the composite form file 1008. The user interface 1104 also displays a list of composite form file names and data file names on the display 108 shown in FIG. 1. Furthermore, the user interface 1104 accepts data indicating a composite form file name or a to-be-overlaid data file name input by a user using the keyboard 107 or the pointing device 109 shown in FIG. 1, and outputs it to the file input/output unit 1102. The data file 1103 is a database in which to-be-overlaid data are described in a plurality of records in a data format such as the comma separated value (CSV) format.

The file input/output unit 1102 is a program to read form information described in a plurality of form information files 1007 of the composite form file 1108 in accordance with selection information indicating a composite form file name and a data file name input via the user interface 1104, and also read specified data from the data file 1103, and output the read data to the overlay print controller 1105.

The overlay print controller 1105 is a program to output the form information described in the form information file 1007 received via the file input/output unit 1102 to the printer 1107 via the printer driver 1106 and register it, interpret text data received via the file input/output unit 1102, produce intermediate data (obtained by converting the to-be-overlaid data into a form that can be easily dealt with by the printer driver 1106 to produce bit map data), and output the produced intermediate data to the printer driver 1106.

As can be understood from the above description, when overlay printing is performed, if the composite form file 1008 is specified, the plurality of information files 1007 included in the composite form file 1008 are processed in one print job.

A specific operation of the present embodiment is described below with reference to FIGS. 12 and 13.

Figure 12:
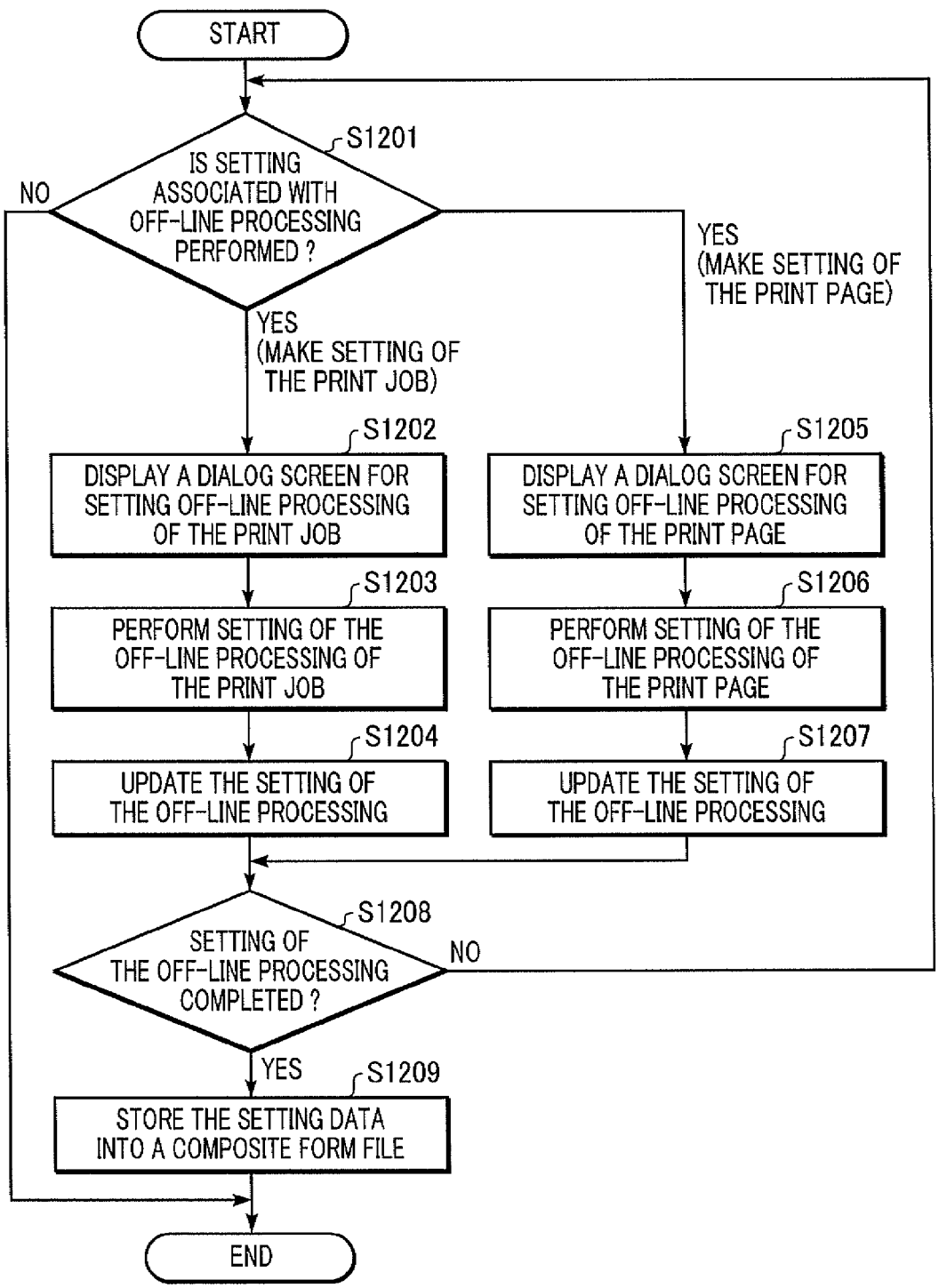
FIG. 12 is a flow chart showing a processing procedure of producing a composite form file, using the form information design system in the information processing apparatus, according to the present invention.

FIG. 12 is a flow chart showing a process of defining a print property (setting associated with off-line processing) associated with each form information, in designing a composite form file by form information design system according to the present embodiment of the invention. The control program of the flow chart shown in FIG. 12 corresponds to the user interface 1006 shown in FIG. 10. The CPU 101 executes this control program when setting information is input via the display controller 1003 to define an item of the form information.

Figure 14:
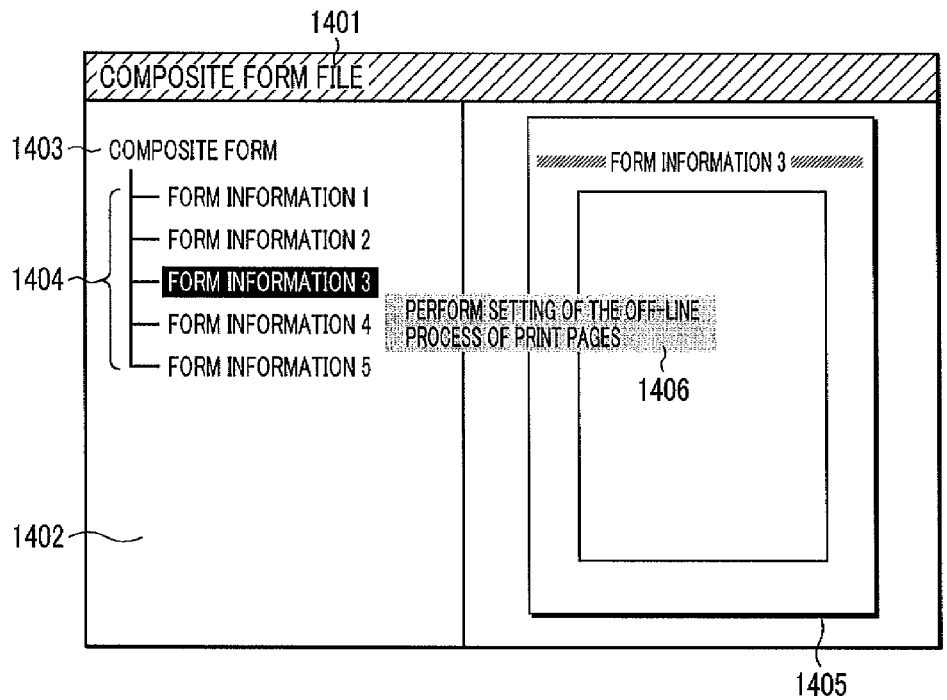
FIG. 14 is a diagram showing a window screen for use in designing a composite form file, using the form information design system in the information processing apparatus, according to the present invention.

In a case in which a user produces a composite form file by using the form information design system, a composite form file design window 1401 such as that shown in FIG. 14 is displayed via the user interface 1006. This composite form file setting window 1401 includes two subwindows, a form configuration window 1402 for displaying a form configuration and a print preview window 1405 for displaying a print preview of a form page selected in the form configuration window 1402.

In the form configuration window 1402, a composite form 1403 of entire document and form information 1404 of each print page are displayed. From the form configuration displayed in a tree structure, a user can recognize the number of pages to be printed since each form information 1404 corresponds to one print page, wherein the same or different form information may be used for different print pages. The user can select a composite form 1403 or form information 1404 using the pointing device 109. The selected composite form 1403 or form information 1404 is displayed in reverse video so that the user can recognize which composite form 1403 or form information 1404 is selected. In the example shown in FIG. 14, form information 3 is selected.

The user can establish the setting associated with the off-line processing for the composite form by selecting a print setting from a menu of the form configuration window 1402 or by clicking the right button of a mouse serving as the pointing device when the composite form 1403 is selected. When form information 1404 of one of the pages is selected, if the right button of the mouse serving as the pointing device is clicked and print setting is selected, setting associated with off-line processing for the selected form information can be performed. If print setting is selected for a composite form or form information, the form information design system performs the following processing.

First, in step S1201, the CPU 101 determines whether a form information production command input by a user via the display controller 103 shown in FIG. 10 is a command to perform setting associated with off-line processing. If the command indicates that setting associated with off-line processing should be performed, the CPU 101 further determines whether the off-line setting should be performed for the entire composite form file (that is, setting of off-line processing for a print job should be performed) or for specific form information included in the composite form file (that is, setting of off-line processing for a specific page should be performed). If it is determined in step S1201 that the form information production command issued by the user is not the command to perform setting associated with off-line processing, the off-line setting routine is terminated.

If it is determined in step S1201 that the form information production command issued by the user is the command to perform setting of off-line processing for the entire composite form file (that is, for the print job), then the process proceeds to step S1202. In step S1202, a dialog screen (FIG. 5) for performing the setting is displayed on the display 108 shown in FIG. 1.

Figures 5, 6:
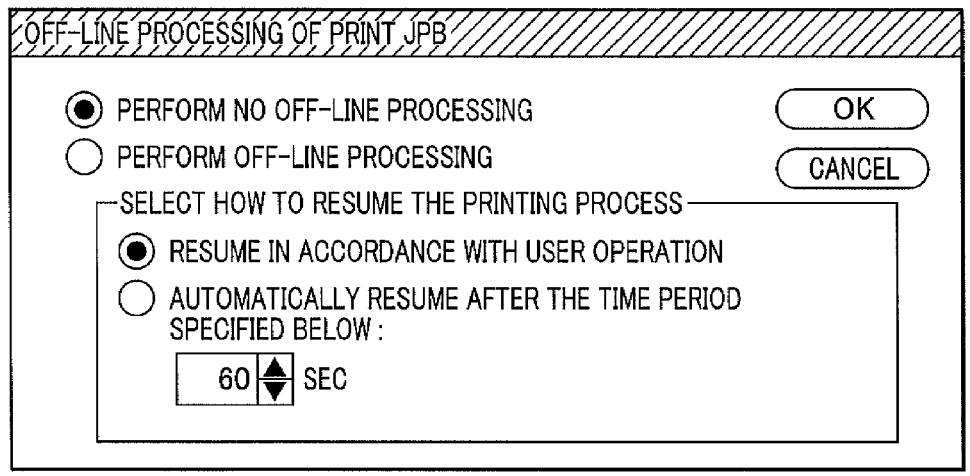
FIG. 5 is a diagram showing an example of a screen, displayed on a display shown in FIG. 1, for use in setting the off-line processing of a print job.
FIG. 6 is a schematic diagram illustrating the data format of a print control file produced in an information processing apparatus according to the present invention.

FIG. 5 shows an example of the setting screen, displayed on the display 108 shown in FIG. 1, for use in performing setting of off-line processing of a print job (composite form).

As shown in FIG. 5, the setting screen includes buttons B1 and B2 for selecting whether off-line processing is to be performed. In the specific example shown in FIG. 5, off-line processing is specified to be performed for the print job. If OK button B3 is pressed, the setting performed on this setting screen is applied. If cancel button B4 is pressed, the setting is cancelled.

The setting screen also includes buttons B5 and B6 for selecting how to resume printing. If button B5 is selected, on-line processing is executed (resumed) in response to a particular operation performed by a user after completion of the off-line processing (in the specific example shown in FIG. 5, button B5 is selected). On the other hand, if button B6 is selected, on-line processing is executed (resumed) automatically when a specified period of time has elapsed. When button B6 is selected, the automatic resume time can be specified, for example, in units of seconds, time setting field B7. Inputting a value directly in time setting field B7 by using the keyboard 107 can also specify the automatic resume time.

In step S1203, the CPU 101 sets the values input via the dialog screen shown in FIG. 5 by the user into the form information design system. In step S1204, the form information design system updates the setting for the composite form file 1008 displayed on the composite form file setting window 1401 shown in FIG. 14.

In a case in which it is determined in step S1201 that the form information production command issued by the user is the command to perform setting of off-line processing for specific form information of the composite form file (that is, for a specific page), then the process proceeds to step S1205. In step S1205, the CPU 101 displays a dialog screen for use in the setting (FIG. 15) on the display 108 shown in FIG. 1.

Figure 15:
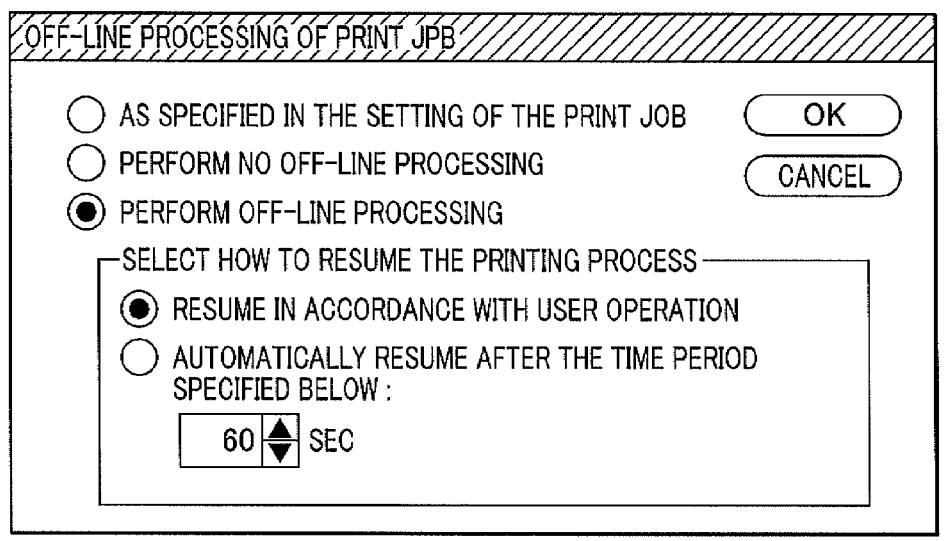
FIG. 15 is a diagram showing an example of a screen, displayed on the display shown in FIG. 1, for use in setting the off-line processing of a print page.

FIG. 15 shows an example of the setting screen, displayed on the display 108 shown in FIG. 1, for use in setting off-line processing of a print page (form information).

As shown in FIG. 5, the setting screen includes buttons B0, B1 and B2 for selecting whether off-line processing is to be performed. In the specific example shown in FIG. 15, off-line processing is specified to be performed for the print job. The button B0 is used to specify that off-line processing should be performed in accordance with setting, performed in the setting screen shown in FIG. 5, for the print job. If button B0 is selected, values input in the setting of off-line processing performed in the setting screen shown in FIG. 5 are employed. The button B1 is used to specify that no off-line processing is to be performed. If button B1 is selected for a particular page, the printer performs printing for that particular page without a break for off-line processing. The button B2 is used to specify that off-line processing is to be performed. If button B2 is selected for a particular page, the printer halts the printing operation at that page to allow off-line processing to be performed. That is, if the button B2 is pressed or checked and the OK button B3 is pressed, the set values are stored in a corresponding form information area of the composite form file. If OK button B3 is pressed, the setting performed on this setting screen is applied. If the cancel button B4 is pressed, the setting is cancelled.

The setting screen also includes buttons B5 and B6 for selecting how to resume printing. If button B5 is selected, on-line processing is executed (resumed) in response to a particular operation performed by a user after completion of the off-line processing (in the specific example shown in FIG. 5, the button B5 is selected). On the other hand, if button B6 is selected, on-line processing is executed (resumed) automatically when a specified period of time has elapsed. When button B6 is selected, the automatic resume time can be specified, for example, in units of seconds, in a time setting field B7. Inputting a value directly in the time setting field B7 by using the keyboard 107 can also specify the automatic resume time.

In step S1206, the CPU 101 sets the values input via the dialog screen shown in FIG. 15 by the user into the form information design system. In step S1207, the form information design system updates the setting for the composite form file 1008 displayed on the composite form file setting window 1401 shown in FIG. 14.

The processing in steps S1202 to S1207 is terminated when the setting of off-line processing for the print job or print pages is completed. In step S1208, the CPU 101 determines whether the setting of the off-line processing is completed. If the setting is not completed, the CPU 101 returns the process to step S1201. If the setting is completed, the process proceeds to step S1209. In step S1209, the CPU 101 stores, in the composite form file 1008, data indicating the setting associated with the off-line processing for the print job or the print pages, performed in the previous steps. FIG. 6 shows an example of the format of the composite form file 1008. At this point of time, the program is completed.

FIG. 6 illustrates the data format of a print control file produced by the printer driver 1106 of the information processing apparatus according to the present invention.

As shown in FIG. 6, data in the print control file includes two parts: a print job information part, and a print page information part. In the print job information part, property information indicating whether to perform off-line processing for the print job is described in accordance with inputting performed in the dialog screen shown in FIG. 5.

In the print page information part, property information indicating the total number of pages of the print job produced by the application is described. Following that, property information associated with each page and page data are described.

In the "print form" fields, form information used for each print page is described. For example, form information 1 is used for a first print page, form information 2 for a second print page, and form information 5 for a fifth print page. In the "page print data" fields, to-be-overlaid data to be overlaid on each form information is described. For example, page print data PD1 is to-be-overlaid data used for the first print page, page print data PD2 is to-be-overlaid data used for the second print page, and page print data PD3 is to-be-overlaid data used for the third print page.

In the "off-line processing" fields, values indicating whether to perform off-line processing are described in accordance with the setting performed by pressing the buttons B0, B1, or B2 in the setting screen shown in FIG. 15. In the specific example shown in FIG. 6, the first page is set so as to accord with the general setting for the print. Because the off-line property for the print job is set to "OFF", off-line processing is not performed for the first page. The off-line property for the second page is set to "ON", and the off-line property for the third page is set to "OFF". In the present embodiment, as can be seen from the above description, "ON" or "OFF" can be selected for each page.

In the present embodiment of the invention, because the off-line property for each page can be set to accord with the setting for the print job, the user can easily perform setting in terms of off-line processing by switching the off-line flag only for necessary pages.

Figure 13:
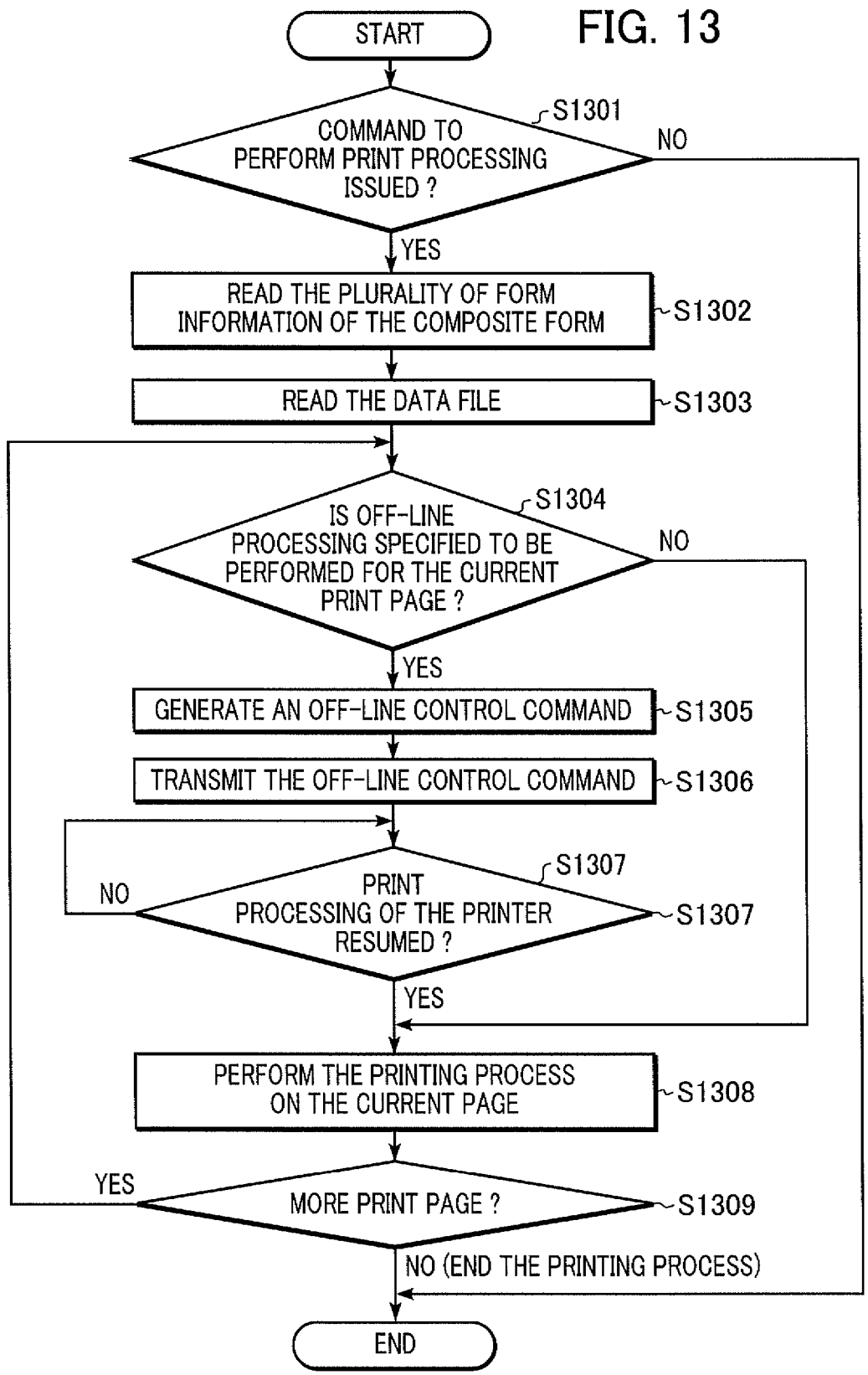
FIG. 13 is a flow chart showing a processing procedure of performing overlay printing of a composite form file, using the form information design system in the information processing apparatus, according to the present invention.

FIG. 13 is a flow chart showing a process performed by the CPU 101 in the overlay print system according to an embodiment of the present invention, to perform overlay printing in accordance with print properties (indicating whether to perform off-line processing) set, in the flow chart shown in FIG. 12, for each form information or for the composite form file. The control program shown in this flow chart corresponds to the overlay print controller 1105 and the printer driver 1106 shown in FIG. 3. When a composite form file name, a data file name, and text data file name and input and further an overlay print command is input via the user interface 1104 shown in FIG. 11, the CPU 101 executes the control program.

More specifically, the process is started when printing is selected from a menu displayed on the user interface screen shown in FIG. 14.

First, in step S1301, the CPU 101 determines whether the overlay print command is issued via the display controller 1003 shown in FIG. 10. If it is determined in step S1301 that the overlay print command is not issued by the user, the process is terminated. If it is determined in step S1301 that the overlay print command is issued by the user, the process proceeds to step S1302. In step S1302, the overlay print controller 1105 reads form information described in form information files 1007 of the composite form file 1008 via the file input/output unit 1102, in accordance with the composite form file name input via the user interface 1104. In step S1303, the overlay print controller 305 reads specified to-be-overlaid data from the data file 1103 in accordance with selection information indicating the data file name input via the user interface 1104.

Thereafter, the printing process (page printing process) is performed successively for the form information files of the composite form file 1008 read in step S1302. More specifically, in step S1304, the CPU 101 determines whether off-line processing is specified to be performed for the current page on the basis of data described in the composite form file 1008. More specifically, if off-line processing is set to be performed for the current page via the dialog screen shown in FIG. 15, the CPU 101 determines that off-line processing is specified to be performed. On the other hand, if off-line processing is set not to be performed in the dialog screen shown in FIG. 15, the CPU 101 determines that off-line processing is specified not to be performed. In the case in which setting of off-line processing for the current page is set to accord with the setting for the print job as a whole, the CPU 101 examines the off-line property of the print job set in the dialog screen shown in FIG. 5, to determines whether to perform off-line processing for the current page.

If off-line processing for the current page is set to "ON" in the dialog screen shown in FIG. 15, and thus if it is determined in step S1304 that off-line processing for the current page is specified to be performed, then the process proceeds to step S1305. In step S1305, the CPU 101 produces an off-line control command for controlling the printer in terms of off-line processing. In step S1306, the CPU 101 transmits the off-line control command to the printer 110 via the printer driver 1106 to halt the printing process performed by the printer. If the setting is performed in the dialog screen shown in FIG. 15 such that the on-line printing process should be resumed in response to a particular operation performed by a user, the printer remains in the off-line state until the user performs an operation to resume the on-line printing process. In the case in which on-line printing is specified to be resumed when a specified period of time has elapsed, a time off-line command with an argument indicating a resume time is produced and transmitted to the printer. In accordance with the time off-line command, the printer maintains the off-line state until the specified period of time has elapsed, and resumes the on-line processing when the specified period of time has elapsed.

In step S1307, the printer driver 1106 determines whether the printer has resumed the printing process, that is, whether the state of the printer has changed into the on-line state on the basis of the status information received from the printer. The process waits in step S1307 until the printing process is resumed. If the printing process is resumed, the process proceeds to step S1308.

In the case in which off-line processing for the current page is set to "OFF" in the dialog screen shown in FIG. 15, and thus if it is determined in step S1304 that off-line processing for the current page is specified not to be performed, a non-off-line command is produced, and the process proceeds to step S1308. Although in the present embodiment, the non-off-line command is produced to control the printer for pages specified, in the print control file shown in FIG. 6, not to be subjected to off-line processing. The on-line command may be produced only for pages specified to be subjected to off-line processing, but no command may be produced for pages specified not to be subjected to off-line processing.

In step S1308, the printer driver 1106 produces page print data, form information, and an overlay command for the current page, and transmits them to the printer 110. In accordance with this data and command, the printer 110 performs printing.

In step S1309, the CPU 101 determines whether there is one or more pages after the page processed in step S1308. If there are one or more pages, the CPU 101 returns the process to step S1304. However, if there are no more pages, the CPU 101 ends the printing process.

The operations of the overlay print controller 1105 and the printer driver 1106 in the above-described manner allows the state of the printer to be changed into the off-line state with specified timing for specified pages.

Figure 7:
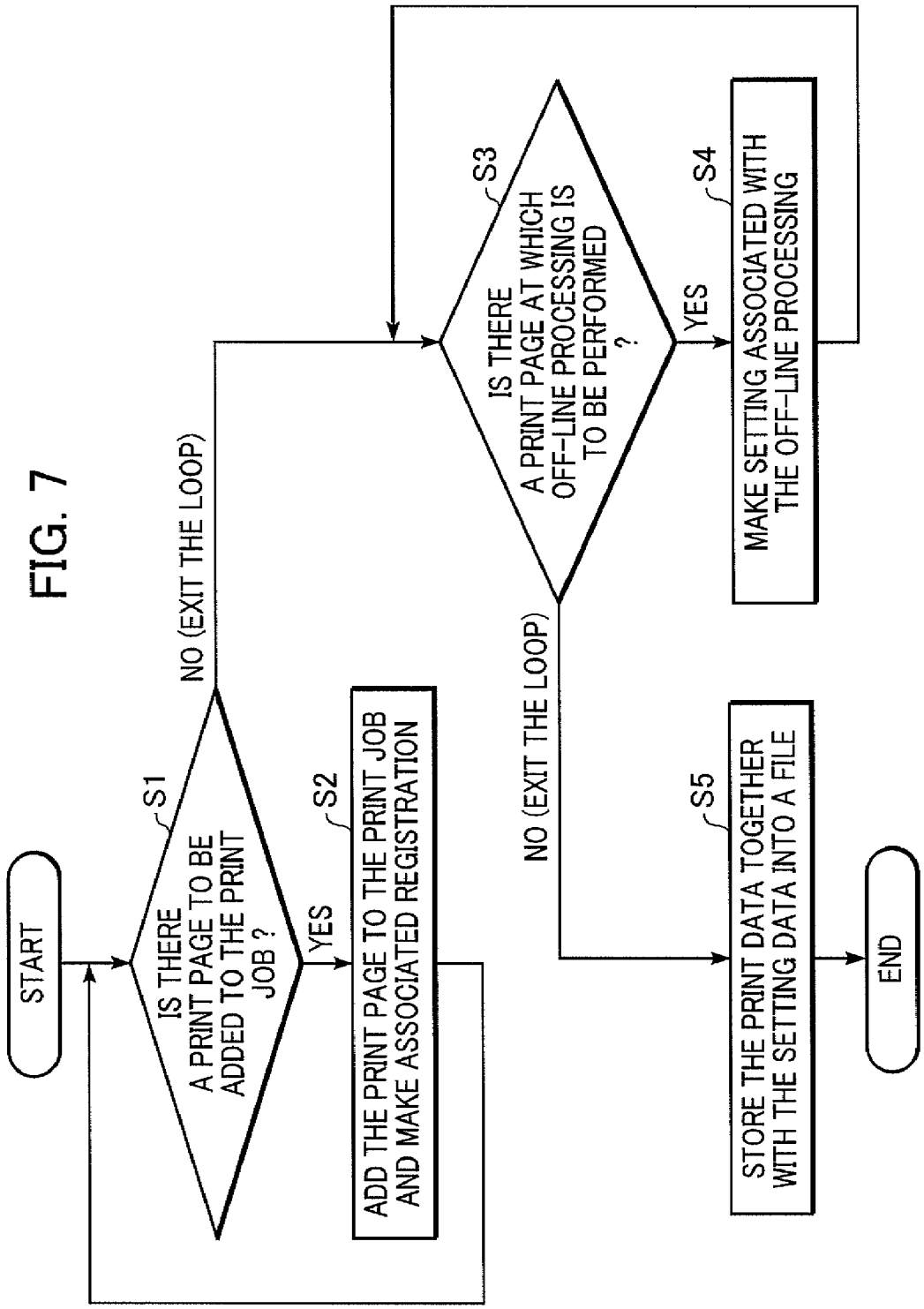
FIG. 7 is a flow chart showing a first data processing procedure performed in the information processing apparatus, according to an embodiment of the present invention.

Although in the flow chart shown in FIG. 13, the off-line command is transmitted to the printer each time a print page specified to be subjected to off-line processing is detected and the form information and print data are transmitted to the printer after the printing processing is resumed, a print control file such as that shown in FIG. 6 may be produced and transmitted to the printer together with a print job. In this case, the printer analyzes the print control file for each page and switches the state of the printer between the on-line state and the off-line sate in accordance with the result of the analysis, thereby achieving similar effects. Referring to FIG. 7, a process of producing a print control file is described.

FIG. 7 is a flow chart showing an example of data processing procedure including steps S1 to S5 performed in the information processing apparatus according to the present invention. Herein, it is assumed that, to control printing of print data including a plurality of pages as one print job, a print control file is produced as shown in FIG. 6.

First, in step S1, the CPU 101 determines whether there is a print page specified, by a user, to be added to the print job. If it is determined in step S1 that there is a print page specified, by the user, to be added to the print job, the process proceeds to step S2. In step S2, the CPU 101 adds the print page to the print job.

The process in steps S1 and S2 ends when there are no more pages to be added to the print job.

If the control program 203 being executed on the CPU 101 determines in step S1 that there are no more pages to be added to the print job, the process proceeds to step S3. In step S3, the CPU 101 determines whether off-line processing is specified to be performed for a particular print page.

If it is determined in step S3 that off-line processing is specified to be performed for a particular print page, the process proceeds to step S4. In step S4, the CPU 101 performs setting in terms of off-line processing for the print job and for the particular print page in the manner as described above with reference to FIG. 5 or 15.

If it is determined in step S3 that off-line processing is not specified to be performed for a particular print page, the process proceeds to step S5. In step S5, data indicating the setting in terms of off-line processing for the print job and respective print pages, performed via steps S1, S2, S3, and S4, is stored in a print control file in the data format shown in FIG. 6, and the process of FIG. 7 is ended.

A printing process according to the print control file produced according to the procedure described above with reference to FIG. 5 is performed as follows.

Figure 8:
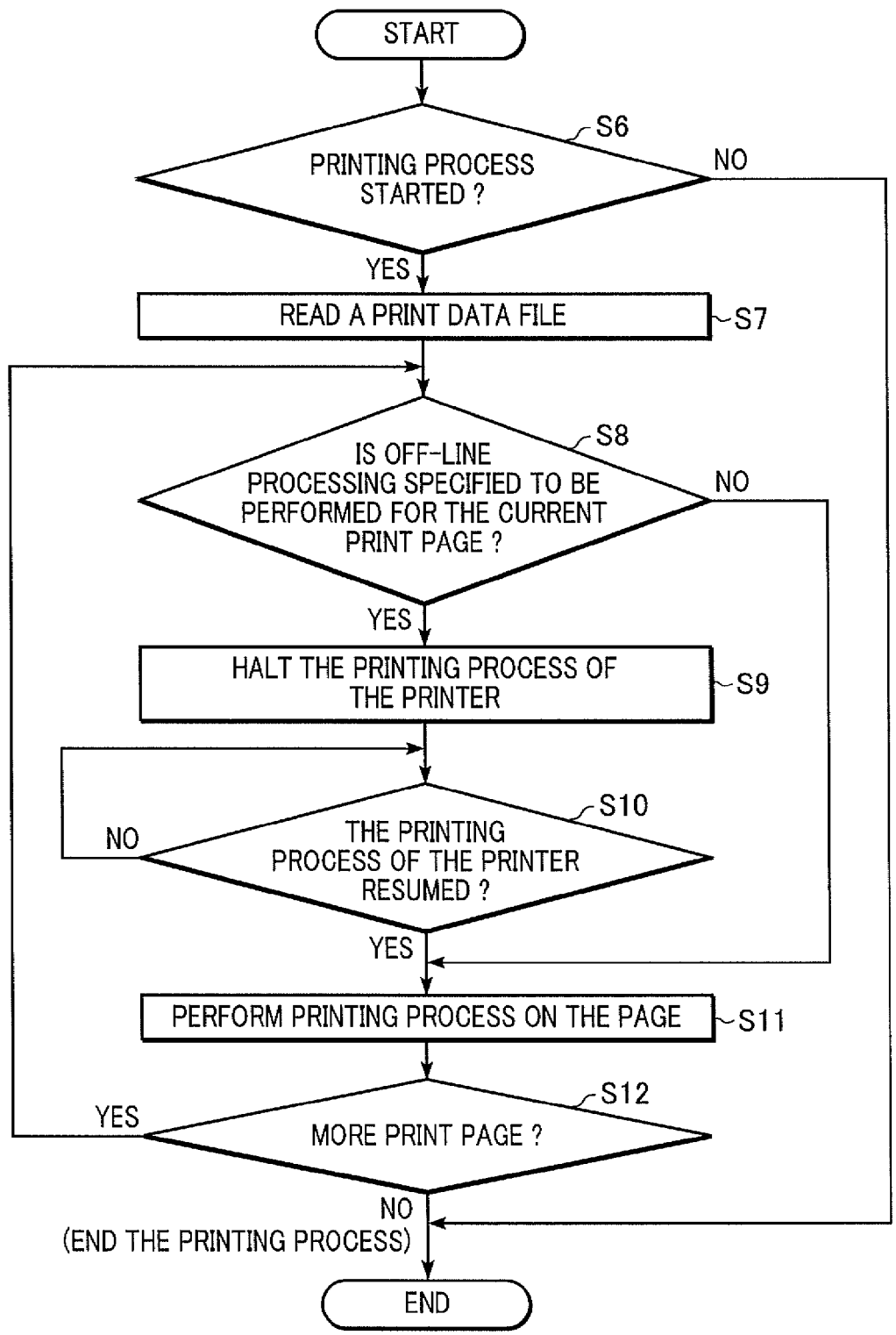
FIG. 8 is a flow chart showing a second data processing procedure performed in the information processing apparatus, according to an embodiment of the present invention.

FIG. 8 is a flow chart showing an example of data processing procedure including steps S6 to S12 performed in the information processing apparatus, to perform printing in accordance with the print control file produced in the process shown in FIG. 7, according to the present invention.

First, in step S6, the CPU 101 determines whether a user has started the printing process of the print control file (print data file). If it is determined in step S6 that the user has not started the printing process of the print control file, the process shown in FIG. 8 is terminated.

If it is determined in step S6 that the user has started the printing process of the print control file, then the process proceeds to step S7. In step S7, the CPU 101 reads the specified print control file.

In step S8, the CPU 101 determines whether off-line processing is specified to be preformed for the current page (that is, whether the "off-line processing" flag shown in FIG. 6 is set or not). If it is determined that off-line processing is specified to be performed for the current page, the process proceeds to step S9. In step S9, the CPU 101 transmits the off-line command to the printer to halt the printing process performed by the printer thereby allowing the user to make a confirmation in terms of the printing environment.

The state into which the printer is brought in step S9 is maintained until a print process resume command is issued.

If it is determined in step S10 that the printing process for the current page is resumed in the specified manner, then the process proceeds to step S11. In step S11, the CPU 101 performs the printing process.

If the printing process for the current page is completed, then, in step S12, the CPU 101 determines whether there are one or more pages to be printed. If there are no more pages, the CPU 101 ends the printing process.

If it is determined in step S12 that there are one or more pages to be printed, steps S8, S9, S10, and S11 are repeated.

In the embodiment described above, off-line processing in printing can be performed for any particular page that needs off-line processing, and thus, after a print job is started, a user can make a confirmation in terms of the printing state of the printer before printing for the particular page is started, and the user can change the state if necessary. This ensures that printing is performed in exactly the same manner as desired by the user.

Although in the embodiment described above, data indicating the setting associated with off-line processing for respective pages of a print job is stored in a print control file, and printing is performed in accordance with the print control file, off-line processing for respective pages of a print job may be set in accordance with a function (off-line setting function) provided by a software library.

In this case, when printing is performed, a user executes the off-line setting function thereby performing off-line processing for desired print pages.

Because setting of off-line processing can be performed using the off-line setting function provided by the software library, a user, in particular a user who develops the system can easily build software using the off-line setting function without needing programming and without encountering a limitation on the file format of specific software. That is, the degree of freedom in designing the software is greatly improved.

Referring to a memory map shown in FIG. 9, a data processing program readable by an information processing apparatus, according to the present invention, is described below.

Figure 9:
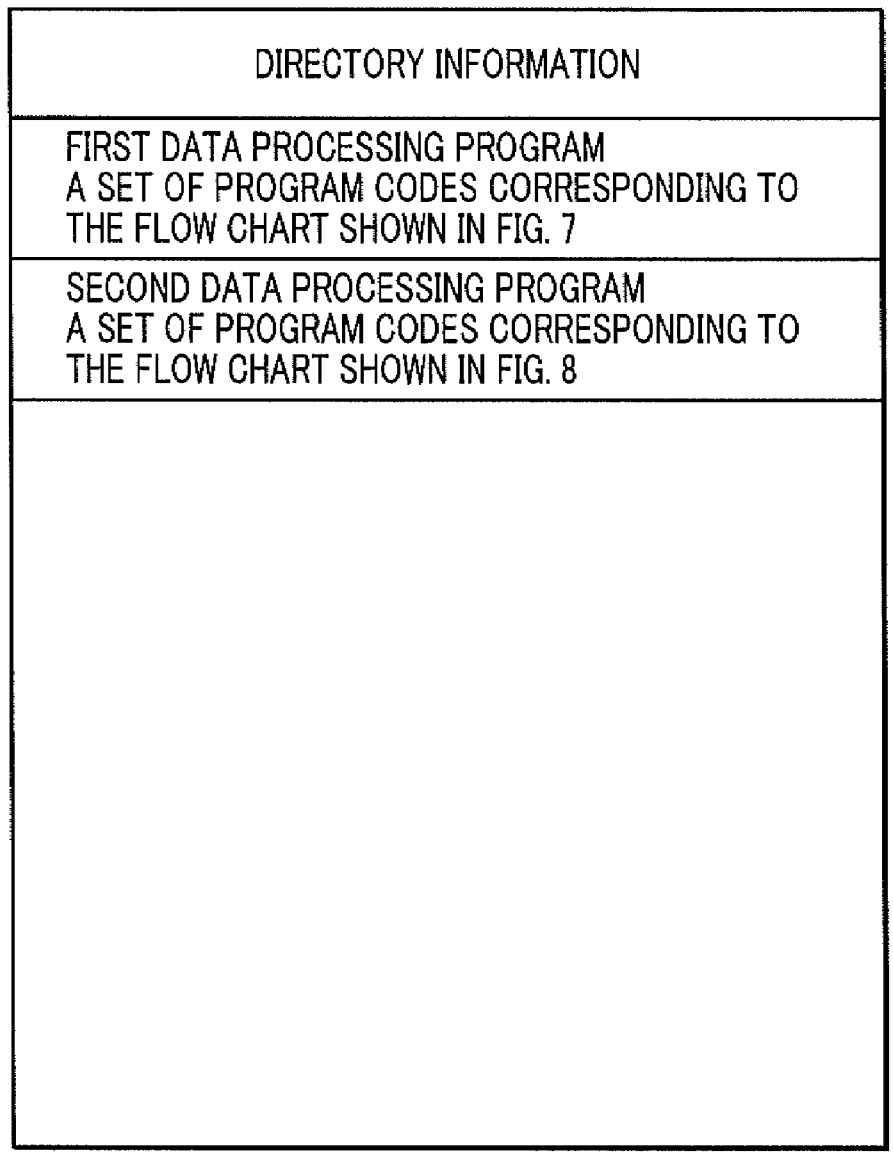
FIG. 9 is a diagram illustrating the memory map of a storage medium that stores various data processing programs readable by the information processing apparatus, according to the present invention.

FIG. 9 is a diagram illustrating the memory map of a storage medium that stores various data processing programs readable by the information processing apparatus, according to the present invention.

Note that in addition to information shown in FIG. 9, information for managing the programs stored in the storage medium, such as information indicating the version, a producer, or the like, and/or other additional information, such as icons indicating respective programs, depending on an operating system (OS) that reads the programs may also be stored in the storage medium.

Data associated with respective programs are also managed by directories. A program for installing a program on a computer may also be stored on the storage medium. When a program to be installed is stored in a compressed form, a program for decompressing the program may also be stored on the storage medium.

The functions shown in FIG. 7 or 8 according to the present embodiment may be realized by installing a program from the outside and executing it on a host computer. In this case, information including the program according to the present invention may be supplied to information apparatuses or an image output apparatus from a storage medium such as a CD-ROM, a flash memory, or a floppy disk, or from an external storage medium via a network.

The objects of the present invention may also be achieved by providing to a system or an apparatus a storage medium having software program code stored thereon for implementing the functions disclosed in the embodiments described above and by reading and executing the program code on a computer (or a CPU or an MPU) disposed in the system or the apparatus.

In this case, the program code read from the storage medium implements the novel functions disclosed in the embodiments described above, and the storage medium on which the program code is stored falls within the scope of the present invention.

Storage media that can be preferably employed in the present invention to supply the program code include a floppy disk, a hard disk, an optical disk, a magneto-optical disk, a CD-ROM, a CD-R, a magnetic tape, a non-volatile memory card, a ROM, and an EEPROM.

The functions disclosed in the embodiments may be implemented not only by executing the program code on a computer, but part or all of the process may be performed by an operating system or the like running on the computer in accordance with a command issued by the program code. Such implementation of the functions also falls within the scope of the present invention.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

In the embodiments described above, the present invention is applied to printing processes in which document data or the like is printed. However, the data to be printed is not limited to document data. For example, the present invention may also be applied to an information processing apparatus designed to print form data or the like. Also in this case, setting can be made such that off-line processing is specified to be performed or not to be performed for each page.

In an aspect, as described above, the present invention provides the information processing apparatus that processes print data including a plurality of pages as one print job and transfers the print job to a printer, in which the printing process can be preset for each page of the print job such that the printing process is halted when off-line processing is needed and the printing process is resumed in response to a resume command. After the print job is started, determination as to whether off-line processing is specified to be performed is made for each page. If the current page is specified to be subjected to off-line processing, the printing process is halted. If an operation to resume the print processing is detected, the printing process is resumed. Thus, after the print job is started, a user can make a confirmation in terms of the printing state of the printer before printing for the particular page is started. This ensures that printing is performed in exactly the same manner as desired by the user.

In another aspect, the present invention provides the information processing apparatus that processes document data including a plurality of pages as one print job and outputs the print job to a printer to print the print job, in which setting as to whether to halt the printing process of the printer is made for each page of the print job, the off-line command is generated for each page at which to halt the printing process of the printer in accordance with the setting, the print job is generated on the basis of the document data such that the generated off-line command is inserted in each specified page, and the print job including the off-line command inserted in each specified page is output to the printer to print the print job. After the print job is started, off-line processing is performed for each specified. Thus, after the print job is started, a user can make a confirmation in terms of the printing state of the printer before printing for the particular page is started. This ensures that printing is performed in exactly the same manner as desired by the user.

While the present invention has been described with reference to what are presently considered to be the exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus that generates a print job to merge a plurality of forms and page data, the apparatus comprising:
   a first display unit configured to display first identification information of first data to be printed and second identification information of second data to be printed;
   a selection unit configured to select the first identification information for selecting the first data as a target form to halt print processing before the print job is generated;
   a second display unit configured to display an image of the first data of the first identification information selected by the selection unit;
   a first setting unit configured to set the halt of the print processing using the first data of the first identification information selected by the selection unit after displaying the image by the second display unit;
   a second setting unit configured to set one of a first resuming method resuming a halted print processing by receiving a resuming instruction of a user and a second resuming method resuming the halted print processing upon expiration of a halt time period of the print processing, wherein the halt time period of the first data in the print job comprising the first and second data is set;
   a halt command generation unit configured to generate a halt command to halt print processing using the first data of the first identification information selected by said selection unit based on setting contents set by said first and second setting units;
   a generation unit configured to generate the print job based on the first and second data and the halt command such that the print processing is halted before printing using the first data of the first identification information selected by selection unit; and
   a transmitting unit configured to transmit the print job generated by said generation unit,
   wherein the print job transmitted by the transmitting unit is processed for printing by the printer.

2. The information processing apparatus according to claim 1, wherein the first and second data is form data.

3. The information processing apparatus according to claim 1, wherein the first and second identification information is each name of the first and second data.

4. A method for controlling a print processes that generates a print job to merge a plurality of forms and page data, the method comprising:
   displaying first identification information of first data to be printed and second identification information of second data to be printed;
   selecting the first identification information for selecting the first data as a target to halt print processing before the print job is generated;
   displaying an image of the first data of a selected first identification information;
   setting the halt of the print processing using the first data of the selected identification information after displaying the image;
   setting one of a first resuming method resuming a halted print processing by receiving a resuming instruction of a user and a second resuming method resuming the halted print processing upon expiration of a halt time period of the print processing, wherein the halt time period of the first data in the print job comprising the first and second data is set;

generating a halt command to halt print processing using the first data of the selected first identification information based on the setting content set by said first and second setting units;

generating the print job based on the first and second data and the halt command such that the print processing is halted before printing using the first data of the selected first identification information; and transmitting the print job generated, wherein the print job transmitted is processed for printing by a printer.

5. A method according to claim 4, wherein the first and second data is form data.

6. A method according to claim 4, wherein the first and second identification information is each name of the first and second data.

7. A non-transitory computer-readable storage medium storing a program that generates a print job to merge a plurality of forms and page data, the program comprising:

displaying first identification information of first data to be printed and second identification information of second data to be printed;

selecting the first identification information for selecting the first data as a target to halt print processing before the print job is generated;

displaying an image of the first data of a selected first identification information;

setting the halt of the print processing using the first data of the selected first identification information after displaying the image;

setting one of a first resuming method resuming a halted print processing by receiving a resuming instruction of a user and a second resuming method resuming the halted print processing upon expiration of a halt time period of the print processing, wherein the halt time period of the first data in the print job comprising the first and second data is set;

generating a halt command to halt print processing using the first data of the selected first identification information based on the setting content set by said first and second setting units;

generating the print job based on the first and second data and the halt command such that the print processing is halted before printing using the first data of the selected first identification information; and transmitting the print job generated, wherein the print job transmitted is processed for printing by a printer.

8. A non-transitory computer-readable storage medium according to claim 7, wherein the first and second data is form data.

9. A non-transitory computer-readable storage medium according to claim 7, wherein the first and second identification information is each name of the first and second data.

* * * * *